US007591725B2

(12) United States Patent
Gatto et al.

(10) Patent No.: US 7,591,725 B2
(45) Date of Patent: Sep. 22, 2009

(54) METHOD FOR CONSOLIDATING GAME PERFORMANCE METERS OF MULTIPLE PLAYERS INTO REGULATORYMETERS

(75) Inventors: Jean-Marie Gatto, London (GB); Sylvie Linard, London (GB); Thierry Brunet De Courssou, Henderson, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 12/146,169

(22) Filed: Jun. 25, 2008

(65) Prior Publication Data

US 2008/0254861 A1 Oct. 16, 2008

Related U.S. Application Data

(62) Division of application No. 11/456,528, filed on Jul. 10, 2006.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................ 463/20; 340/323; 463/1; 463/12; 463/16; 463/25; 272/371

(58) Field of Classification Search .................... 463/25
See application file for complete search history.

(56) References Cited

U.S. PATENT DOCUMENTS 2,148,828 A * 2/1939 Myers ........................ 194/240
4,440,443 A 4/1984 Nordskog
4,636,951 A * 1/1987 Harlick ........................ 463/25
5,007,649 A * 4/1991 Richardson .................. 463/25
5,299,810 A * 4/1994 Pierce et al. .................. 463/2
5,429,361 A 7/1995 Raven et al.
5,494,294 A * 2/1996 Cappetta ..................... 273/269
5,593,349 A * 1/1997 Miguel et al. ................. 463/30
5,669,818 A 9/1997 Thorner et al.
5,765,910 A 6/1998 Larkin et al.
5,807,177 A 9/1998 Takemoto et al.

(Continued)

OTHER PUBLICATIONS

International Preliminary Report on Patentability of Jan. 22, 2009 in related International Application PCT/ US2007/071604 (8 pages).

(Continued)

*Primary Examiner*—John M. Hotaling, II
*Assistant Examiner*—Paul A. D'Agostino
(74) *Attorney, Agent, or Firm*—Young Law Firm, P.C.

(57) ABSTRACT

A method for a multi-reel game to be played on a single regulated gaming machine by two players may include steps of assigning a predetermined number of reels of the multi-reel gaming machine to a first player and a predetermined number of reels of the multi-reel gaming machine to a second player; maintaining game performance meters for each player; consolidating the game performance meters into regulatory meters; providing a random outcome upon player interaction and displaying the symbols associated with the random outcome; and awarding credits to the first player if a winning symbol combination of symbols is displayed on the reels assigned to the first player and awarding credits to the second player if a winning symbol combination is displayed on the reels assigned to the second player.

15 Claims, 12 Drawing Sheets

U.S. PATENT DOCUMENTS

| | | | | | |
|---|---|---|---|---|---|
| 5,816,918 | A | * | 10/1998 | Kelly et al. | 463/16 |
| 5,823,879 | A | | 10/1998 | Goldberg et al. | |
| 6,007,427 | A | * | 12/1999 | Wiener et al. | 463/17 |
| 6,015,344 | A | * | 1/2000 | Kelly et al. | 463/16 |
| 6,050,895 | A | | 4/2000 | Luciano et al. | |
| 6,077,163 | A | | 6/2000 | Walker et al. | |
| 6,089,982 | A | * | 7/2000 | Holch et al. | 463/42 |
| 6,098,458 | A | * | 8/2000 | French et al. | 73/379.04 |
| 6,293,868 | B1 | * | 9/2001 | Bernard | 463/42 |
| 6,322,451 | B1 | * | 11/2001 | Miura | 463/42 |
| 6,358,150 | B1 | * | 3/2002 | Mir et al. | 463/28 |
| 6,361,441 | B1 | * | 3/2002 | Walker et al. | 463/42 |
| 6,394,894 | B1 | * | 5/2002 | Okitsu et al. | 463/3 |
| 6,419,230 | B1 | * | 7/2002 | Cass | 273/259 |
| 6,464,595 | B2 | * | 10/2002 | Tsujita | 473/70 |
| 6,514,139 | B2 | * | 2/2003 | Levitan | 463/16 |
| 6,767,282 | B2 | * | 7/2004 | Matsuyama et al. | 463/3 |
| 6,775,580 | B2 | * | 8/2004 | Jira et al. | 700/92 |
| 6,793,575 | B2 | * | 9/2004 | Brown et al. | 463/6 |
| 6,910,734 | B2 | | 6/2005 | Steelman | |
| 6,942,574 | B1 | | 9/2005 | LeMay et al. | |
| 7,063,618 | B2 | * | 6/2006 | Walker et al. | 463/25 |
| 7,152,158 | B2 | | 12/2006 | Watanabe et al. | |
| 2001/0029205 | A1 | | 10/2001 | Taho et al. | |
| 2001/0036868 | A1 | * | 11/2001 | Roy et al. | 472/130 |
| 2002/0004419 | A1 | * | 1/2002 | Odake et al. | 463/7 |
| 2002/0026581 | A1 | | 2/2002 | Matsuyama et al. | |
| 2002/0119824 | A1 | * | 8/2002 | Allen | 463/42 |
| 2002/0147040 | A1 | | 10/2002 | Walker et al. | |
| 2002/0169013 | A1 | * | 11/2002 | Serizawa et al. | 463/6 |
| 2002/0177477 | A1 | * | 11/2002 | Okitsu et al. | 463/3 |
| 2002/0193156 | A1 | * | 12/2002 | Nishimura | 463/2 |
| 2003/0033255 | A1 | | 2/2003 | Burton et al. | |
| 2003/0190949 | A1 | | 10/2003 | Williams | |
| 2003/0190960 | A1 | * | 10/2003 | Jokipii et al. | 463/42 |
| 2003/0211881 | A1 | | 11/2003 | Walker et al. | |
| 2003/0236117 | A1 | | 12/2003 | Okada | |
| 2004/0039911 | A1 | | 2/2004 | Oka et al. | |
| 2004/0137978 | A1 | * | 7/2004 | Cole et al. | 463/16 |
| 2004/0224773 | A1 | * | 11/2004 | Sham | 463/42 |
| 2004/0224777 | A1 | * | 11/2004 | Smith et al. | 463/47 |
| 2005/0003878 | A1 | * | 1/2005 | Updike | 463/16 |
| 2005/0014554 | A1 | | 1/2005 | Walker et al. | |
| 2005/0168021 | A1 | | 8/2005 | Real et al. | |
| 2006/0211470 | A1 | * | 9/2006 | Walker et al. | 463/16 |

OTHER PUBLICATIONS

International Search Report in related PCT application PCT/US07/71604, mailed Sep. 25, 2008.

Written Opinion of ISR in related PCT application PCT/US05/15167, mailed Sep. 25, 2008.

International Search Report in corresponding PCT application PCT/US07/71604, mailed Oct. 19, 2005.

Written Opinion of ISR in corresponding PCT application PCT/US05/15167, mailed Sep. 25, 2008.

* cited by examiner

ALTERNATING PLAY

SIMULTANEOUS PLAY

METHOD FOR CONSOLIDATING GAME PERFORMANCE METERS OF MULTIPLE PLAYERS INTO REGULATORYMETERS

CROSS-REFERENCE TO RELATED APPLICATIONS

The present application is a divisional of application Ser. No. 11/456,528, filed Jul. 10, 2006, which application is hereby incorporated herein by reference in its entirety and from which priority is hereby claimed under 35 U.S.C. §120. The present application is related in subject matter to a divisional application filed on even date herewith, identified as Ser. No. 12/146,137 and application Ser. No. 10/892,541, filed Jul. 15, 2004, which applications are hereby incorporated herein by reference in their entireties.

COPYRIGHT NOTICE/PERMISSION

A portion of the disclosure of this patent documents contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings referred to herein: Copyright 2006, Cyberview Technology, Inc., All Rights Reserved.

BACKGROUND OF THE INVENTION

1. Field of the Invention

Embodiments of the present inventions relate generally to the field of regulated pay computer-controlled games, either games of skills or games of chance.

2. Description of the Prior Art and Related Information

Since its rise to popularity in the late 19$^{th}$ century, the slot machine has been designed, marketed, and used as single player device. Despite a string of twentieth century innovations such as video reels, multi-line play, and secondary game play that have redefined, in large part, the slot machine gaming experience, slot machine game designers have remained faithful to the single player model. While a minority of gaming titles such as WMS' Monopoly feature secondary games with a multi-player element, no game designer has introduced a platform in which multiple players may share in primary game play.

As a result of this prevailing mindset, couples or teams wishing to share in slot machine game play have been forced to sit in one another's lap, to alternate use of a gaming machine's single seat, to keep track of each player's performance in their heads, or to enter into some other imperfect arrangement. From the foregoing, it may be appreciated that new and improved multi-player gaming paradigms are needed. However, some of the most significant obstacles facing modern game designers seeking to address these issues are local gaming regulations that are reluctant to adopt new gaming paradigms.

SUMMARY OF THE INVENTION

According to an embodiment thereof, the present invention is a method for a multi-reel game to be played on a single regulated gaming machine by two players. The method may include steps of assigning a predetermined number of reels of the multi-reel gaming machine to a first player and a predetermined number of reels of the multi-reel gaming machine to a second player; maintaining game performance meters for each player; consolidating the game performance meters into regulatory meters; providing a random outcome upon player interaction and displaying the symbols associated with the random outcome; and awarding credits to the first player if a winning symbol combination of symbols is displayed on the reels assigned to the first player and awarding credits to the second player if a winning symbol combination is displayed on the reels assigned to the second player.

The consolidating step may be carried out with the regulatory meters in each gaming machine providing metering for one player, one game and one gaming machine. The method may further include a step of assigning a predetermined number of reels to both first player and second player. The method may further include a step of awarding credits to be shared amongst both players when a predetermined winning symbol combination is obtained across all reels. The method may also include a step of enabling selection of a single-player mode or in two-player mode and enabling game play accordingly. The assigning step may be carried out with at least one reel of the multi-reel game is assigned to both the first and the second players. The awarding step may be carried out with only one of the first and second players being awarded credits. The awarding step may be carried out with both the first and second players being awarded credits. The awarding step may be carried out with the first or the second players being awarded a greater number of credits than the other one of the first and second players.

According to another embodiment thereof, the present invention is a method that may include providing a regulated game, the regulated game including a plurality of symbols disposed so as to define at least a first symbol region and a second symbol region; assigning at least the first symbol region to a first player and assigning at least the second symbol region to a second player; maintaining separate game performance meters for the first player and for the second player; consolidating the separate game performance meters maintained for the first and second players into regulatory meters; providing an outcome across the at least first and second symbol regions upon each player interaction and providing a combination of the plurality of symbols associated with the outcome; and awarding credits to the first player at least when the symbol combination associated with the outcome may include a winning symbol combination in the first symbol region and awarding credits to the second player at least when the symbol combination associated with the outcome may include a winning symbol combination in the second symbol region.

The method may also include a step of awarding credits to be shared amongst at least the first and second players when a predetermined winning symbol combination is obtained spanning across the at least first and second symbol regions. The method may also include selecting whether the game is played in single-player mode or in multi-player mode. The consolidating step may be carried out with the regulatory meters providing metering for one player, one game on one gaming machine. The providing step may be carried out with the game defining at least three symbol regions and the assigning step may be carried out with at least one of the at least three symbol regions being assigned to both the first and the second players. The providing step may be carried out with the providing step being carried out with the game being a slot game including a plurality of spinning reels having the plurality of symbols provided thereon. The awarding step may be carried out with only one of the first and second players being awarded credits. The awarding step may be carried out with both the first and second players being awarded credits. Alternatively still, the awarding step may be carried out with one of the first and second players being awarded a greater number of credits than the other one of the first and second players.

DETAILED DESCRIPTION

Reference will now be made in detail to the construction and operation of preferred implementations of the present invention illustrated in the accompanying drawings. The following description of the preferred implementations of the present invention is only exemplary of the invention. The present invention is not limited to these implementations, but may be realized by other implementations.

Figure 1:
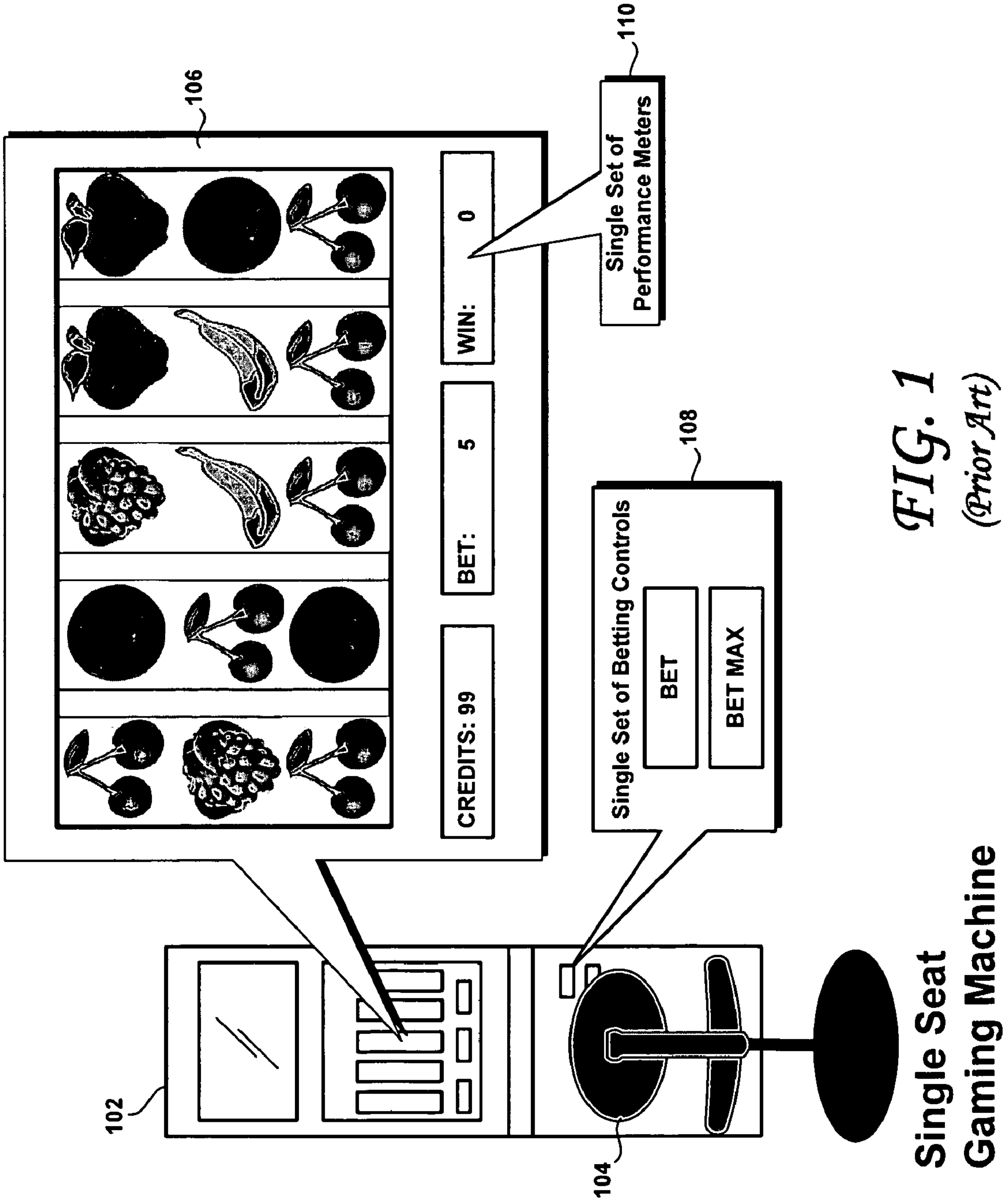
FIG. 1 (Prior Art)
FIG. 1 shows a conventional implementation of a single seat gaming machine.

FIG. 1 shows a conventional single seat gaming machine. 102 Single seat gaming machines such as shown at 102 have only one seat 104 for seating a single player, a single set of betting controls 108, are configured to play a single game 106 (in this case, a video slot game) and a single set of onscreen game performance meters 110 to track player performance. Such gaming machines, therefore, cannot comfortably accommodate more than one player. For convenience, gaming machines of the type shown in FIG. 1 may be referred to by the shorthand "1-player/1-slot/1-game," where the terms "slot" and "gaming machine" are used interchangeably herein. When two players share the gaming machine 102, this gaming model may be called, for example, the "2-player/1-seater/1-game" model, and is representative of conventional gaming machines and methods. In this model in which two ore more players share a single single-player gaming machine a first player may share a seat with a second player (or one sits on the other's lap) to share in the slot machine game play and both players may engage in some lively and friendly competition for hours. Both players may play in turn and may keep track of each other's performance in their heads. Alternatively, both players may decide to play, for example, 100 credits in turn, decide to reach a certain target before handing over game play to the other player or each player may play for, e.g., 10 minutes before turning over game play to the other player. When cashing out, the players could then decide to collect the winnings at the cashier and divide the winnings amongst themselves in a friendly manner, according to each player's performance. Naturally, this is quite an imperfect and inconvenient arrangement. As may be appreciated, the above 2-player gaming style has no impact on gaming regulation.

Figure 2:
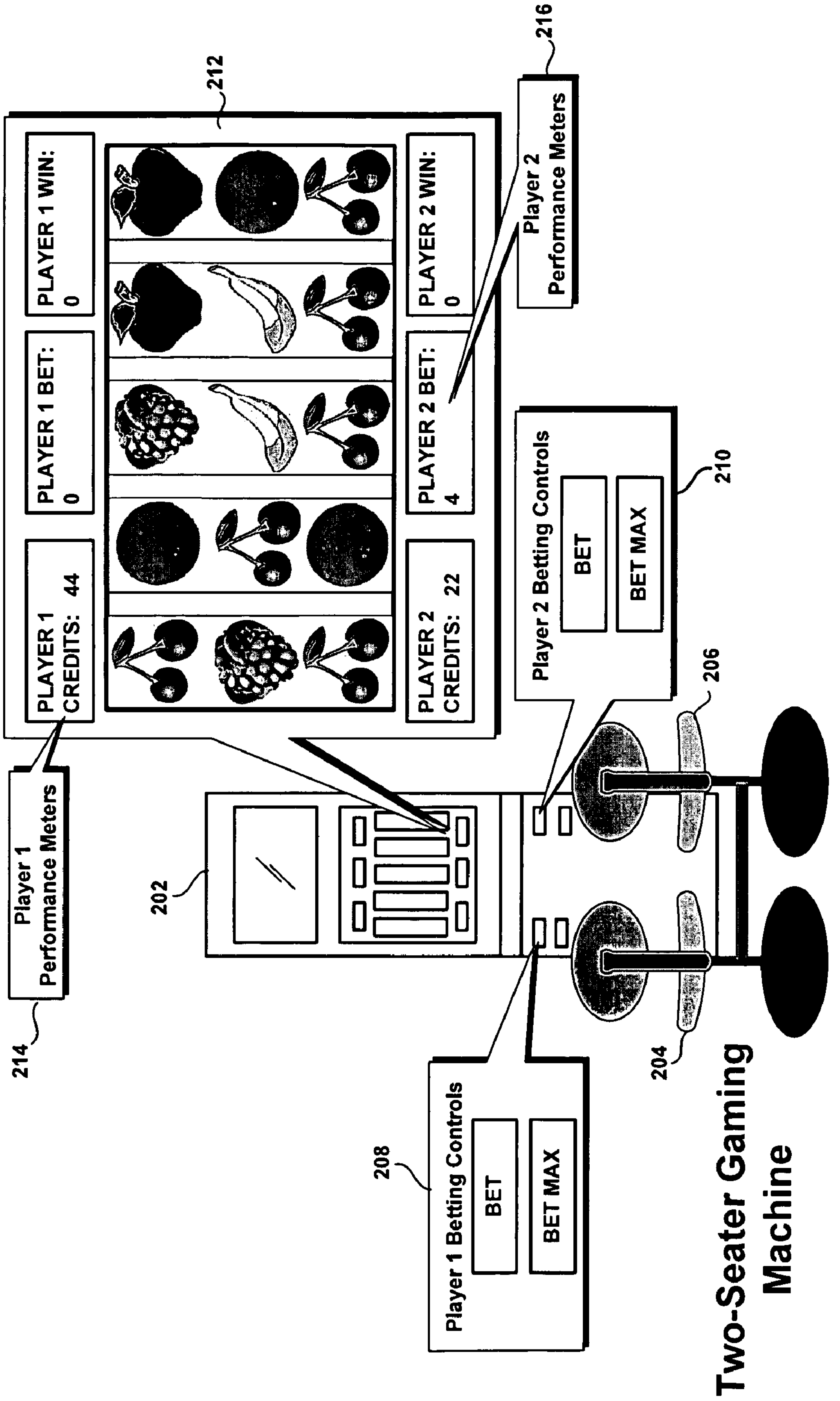
FIG. 2 shows a two-seater gaming machine, according to an embodiment of the present invention.

FIG. 2 shows a two-seater gaming machine 202, according to an embodiment of the present invention. The gaming machine 202 may include a first seat 204 for a first player (not shown) and a second seat 206 for a second player (not shown). It is to be noted that embodiments of the present invention are not limited to embodiments having two seats, as alternate seating arrangements may be provided, such as bench seating for two or more players, and a conventional single person seat whereby the players alternate seating, or one player seats on the laps of the other player (a couple), for example. The gaming machine 202 may be provided with first betting controls 208 for the first player and second betting controls 210 for the second player. The two-seater may include one or more displays. One or more of the displays may display the single game 212 (in this case, a video slot machine game) and the player 1 game performance meters 214 and the player 2 game performance meters 216. The game performance meters, as shown, may display an identification of the player, the number of remaining credits of the player, the player's bet and the outcome of the player's wager (e.g., win or lose), for example. The two-seater gaming machine 202 may have two seats, two sets of betting controls, two sets of game performance meters and one game and may comfortably accommodate two players. Alternatively, both players may share a single set of betting controls. If the name of the players is available either by direct entry into the gaming machine (using keyboard emulation on the touch screen, for example) or via a player account, the name of each player may be shown on the screen.

Figure 3:
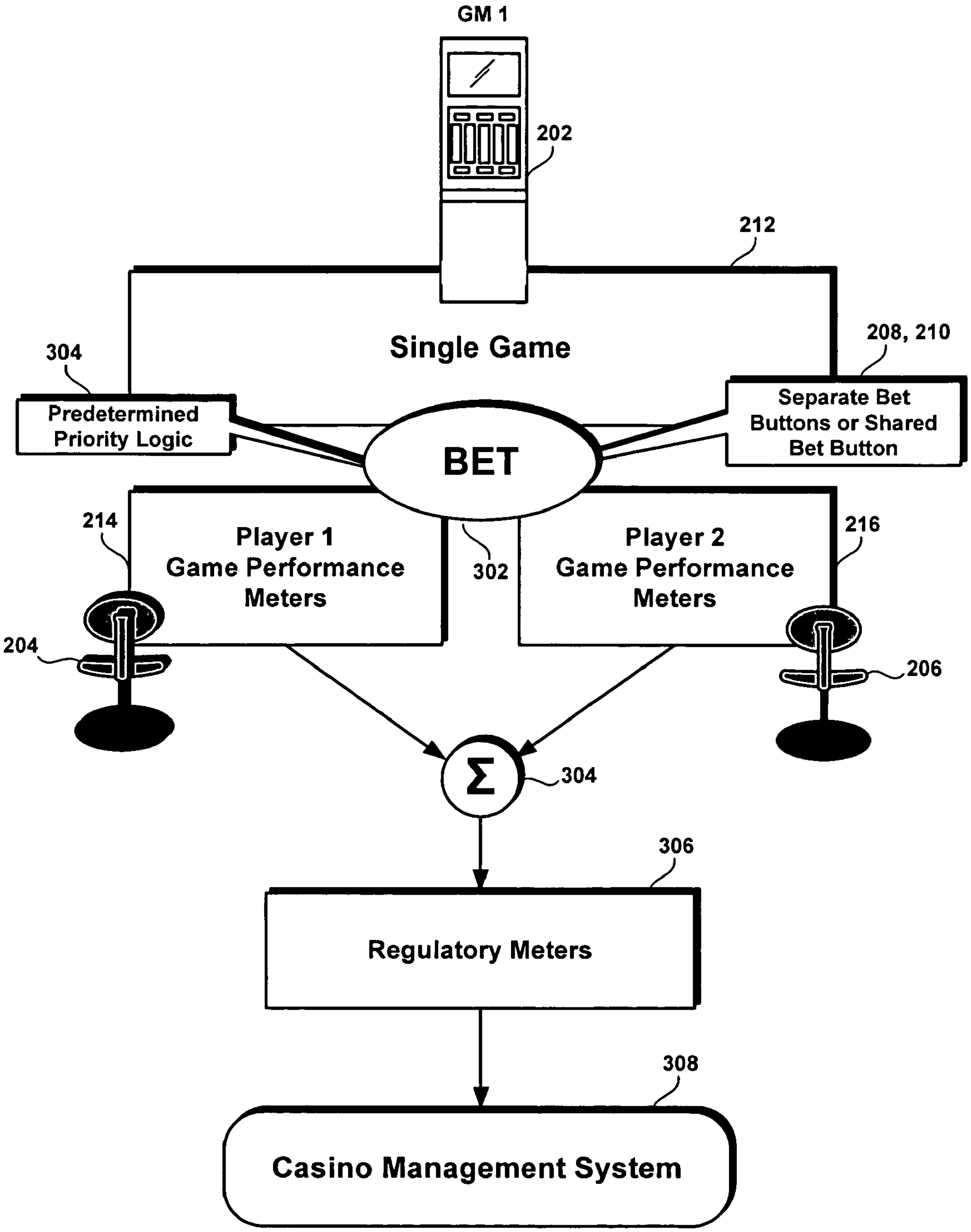
FIG. 3 shows aspects of an embodiment of the present invention, including a two-seater/one-slot/one-game meter architecture implementation relative to the regulatory meters.

FIG. 3 is a view of the model introduced in FIG. 2, together with its associated game performance and regulatory meter architecture, according to an embodiment of the present invention. As shown in FIG. 3, although there are two players seated in respective chairs 204, 206, they are playing (and betting on) a single game 212 at a single gamine machine (GM 1) 202. As indicated at 208, 210, the gaming machine 202 may include first and second betting controls. Alternately, the gaming machine may include only a single set of betting controls and prompt each player in turn (according to predetermined priority logic 304 or randomly) to use the single set of betting controls to place their bet, as suggested at 302. For example, the priority logic 304 may be configured such that the gaming terminal software may select the player to play in accordance with a predetermined logic scheme such as, for example: 1) the first player to press a button plays; 2) each player plays in turn; or 3) play is at random. The play buttons may be configured such that the two players are considered to be a single player. According to embodiments of the present invention, irrespective of the number of players playing on the gaming machine 202 (in the example developed herein, two such players), from the casino management system's perspective and from a regulatory perspective, only a single set of meters exist. This single set of meters may be termed, as shown in FIG. 3, as "regulatory meters" 306, to distinguish them from the game performance meters 214, 216 that may be displayed on the game machine(s) display(s). That is, according to an embodiment of the present invention, the game performance meters 214, 216 may be summed (added) together (as symbolized by the Greek symbol "Σ" 304 in FIG. 3) to form the regulatory meters 306. It is these regulatory meters 306 that may be passed on to the casino management system (or other central system) 308. That is, in the illustrative example of FIG. 3, for single a two-player gaming machine:

Player 1 Game Performance Meters+Player 2 Game Performance Meters=Regulatory Meters The gaming machine 202 may accept payments (cash or cash-less) and/or deliver/display payments (cash or cash-less) or winnings/bonuses (if any) for the team (the team comprising player 1 and player 2, in this example) or for each player. It is to be noted that, from the point of view of the casino management system 308, there is only a single gaming machine playing a single game with a single player (i.e., the gaming machine 202 is a 1-player/1-slot/1-game gaming machine) because it receives only a single set of regulatory meters, as it would from a conventional single player gaming machine. To facilitate the distinction between the two types of meters introduced herein, embodiments of the present invention make a distinction between game performance meters and regulatory meters. Game performance meters, as shown above, may be displayed for the player(s) (at the same time or in turn), may not exist individually outside of the gaming machine(s) and are not individually reported to the casino management system 308. As the name implies, game performance meters measure each player's performance during the game. Regulatory meters, by contrast, may not be displayed to the players (but could), may be formed by summing the game performance meters 214, 216 and may be reported to the casino management system 308 (or may be otherwise exposed to the casino management system). Note that the architecture shown in FIG. 3 is not limited to one gaming machine and two players. Indeed, the architecture described in FIG. 3 may be readily scaled and extended to implementations in which the gaming machine 202 accommodates more than two players and to implementations in which more than one gaming machine 202 contributes its own game performance meters (of one or more players) to the sum of game performance meters that form the regulatory meters 306, as described hereunder.

Figure 4:
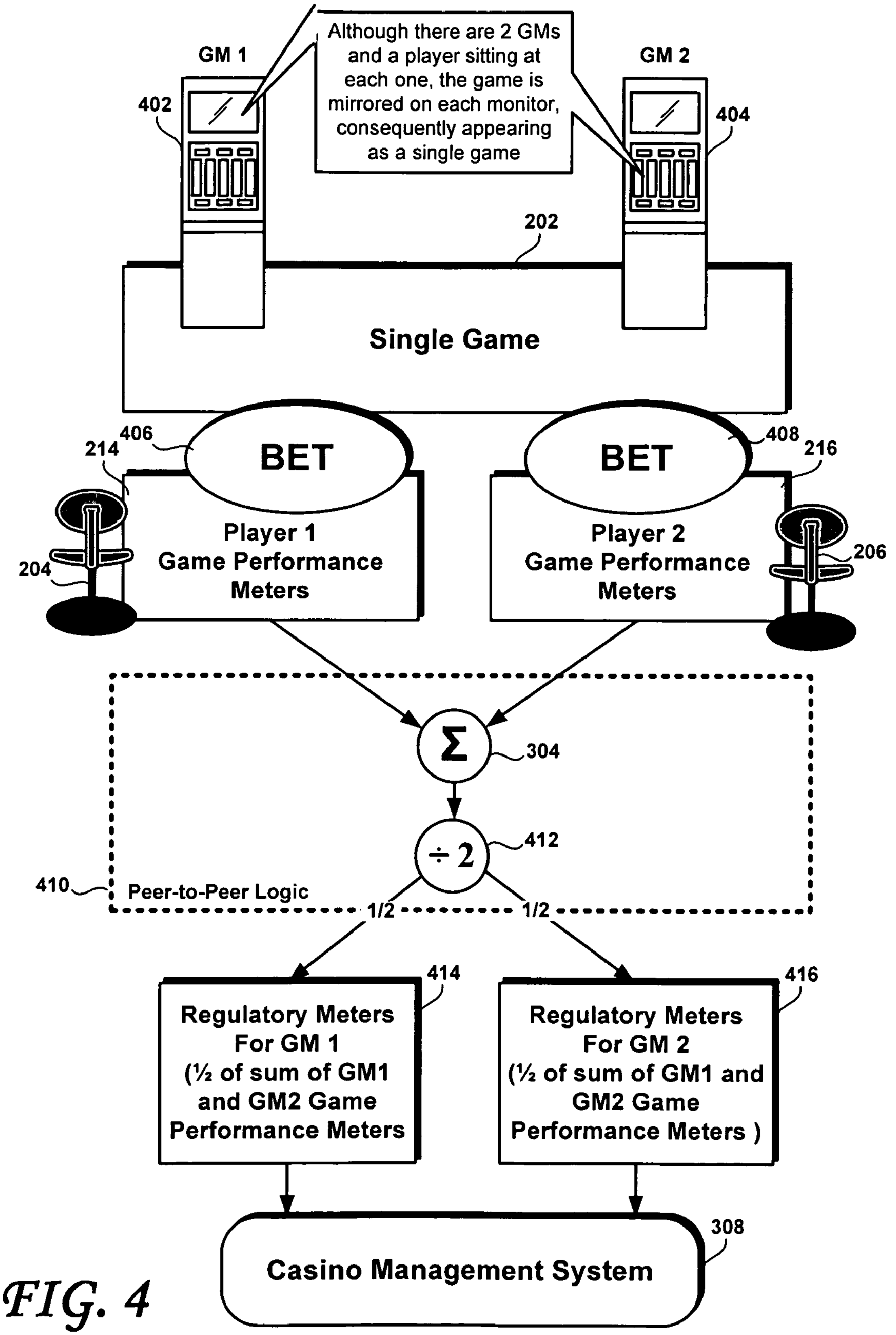
FIG. 4 shows aspects of another embodiment of the present invention, including a one-seater/two-slot/one-game meter architecture implementation relative to the regulatory meters.
Figure 7:
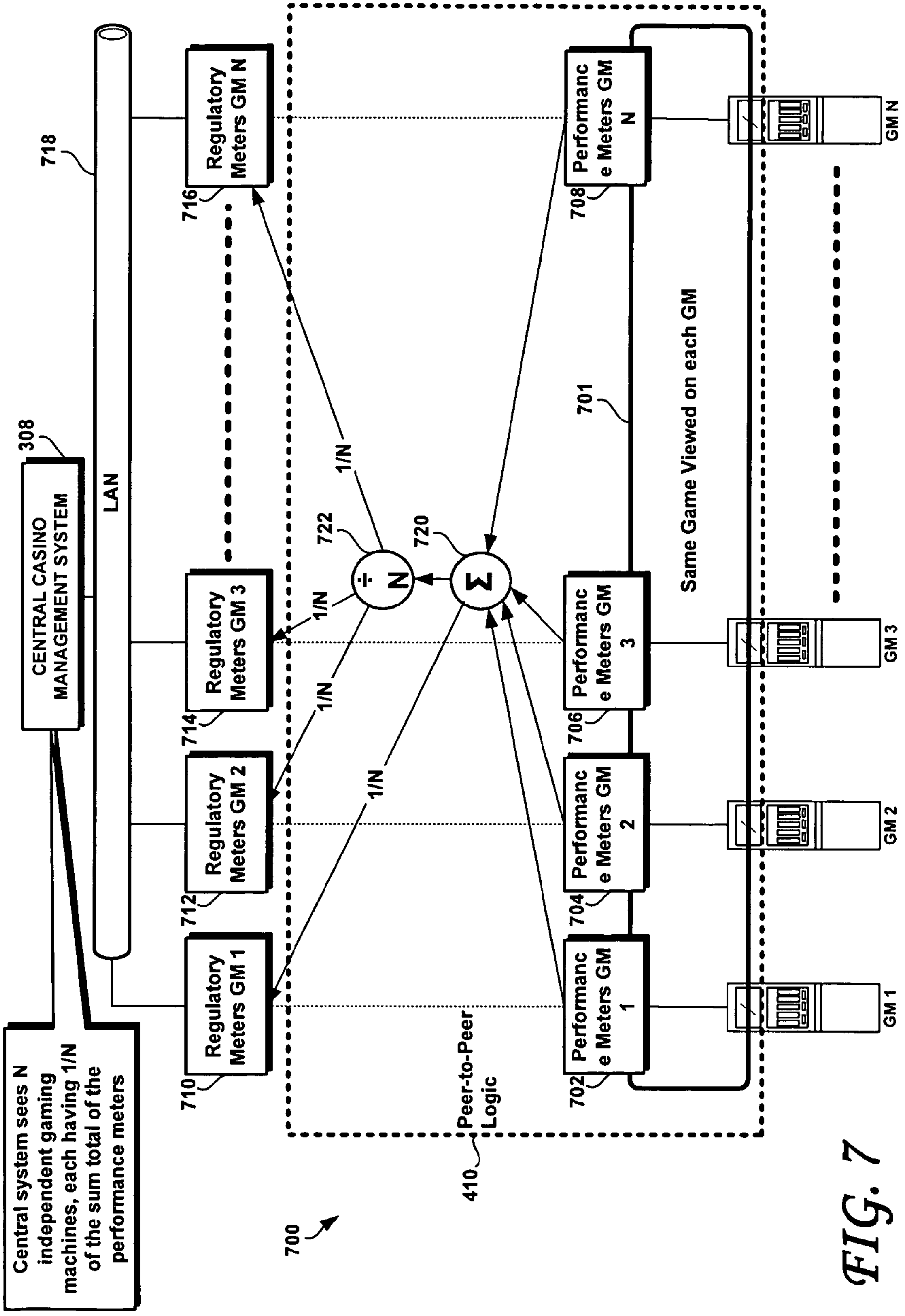
FIG. 7 shows a gaming system according to an embodiment of the present invention.

FIG. 4 shows aspects of another embodiment of the present invention, including a 2-seater/2-slots/1-game gaming machine implementation, showing the game performance meters relative to the regulatory meters. As shown, the implementation of FIG. 4 includes a first gaming machine 402 and a second gaming machine 404. Both gaming machines 402 and 404 may execute and enable game play of a single game 202. That is, player 1 seated at seat 204 of gaming machine 402 plays the game 202 on gaming machine 402, and player 2 seated at seat 206 of gaming machine 404 plays the same game 202 on gaming machine 404, as is being played on the first gaming machine 402. Each player may place a bet independently, as shown at 406 and 408—or may do so when prompted by the gaming machine. Game performance meters 214 for player 1 may be maintained within gaming machine 402 (and/or 404). Likewise, game performance meters 216 may be maintained within gaming machine 404 (and/or 402). Such game performance meters 214, 216 may be displayed on their respective gaming machines for their respective player. Alternatively, both game performance meters 214, 216 may be displayed (and/or otherwise provided) for each player on both the gaming machines 402, 404. The game performance meters 214, 216 may then be consolidated (e.g., summed) at 304 by peer-to-peer logic, as shown at 410. To form the regulatory meters, the consolidated game performance meters may then be evenly split among the number of gaming machines playing the single game 202. In the exemplary implementation of FIG. 4, the consolidated game performance meters are split evenly among the two participating gaming machines 402, 404. That is, the consolidated game performance meters may be divided by two, as shown at 412. In this manner, one half of the consolidated game performance meters forms the regulatory meters 414 that are reported to the casino management system 308 for gaming machine 1, referenced at 402 in FIG. 4. Likewise, the other half of the consolidated game performance meters forms the regulatory meters 416 for gaming machine 2, shown at 404 in FIG. 4. The regulatory meters 416 may then be reported to the casino management system 308 or other back end management and/or auditing system to fulfill all regulatory requirements in the appropriate jurisdiction, in the same manner as were the regulatory meters 414 for gaming machine 1, shown at 414. From the casino management's perspective, therefore, each gaming machine 402, 404 reports its own regulatory meters 414, 416, as if each gaming machine 402, 404 were a conventional standalone, single-player gaming machine. As may be appreciated, this model may readily be extended to an n-player/n-slot/1-game model noting that in all cases, the same game may be shared and viewed by all players on each of the n gaming machines. Such an embodiment is shown in FIG. 7 and described further below. Although the players may each have separate game performance meters, such game performance meters, according to embodiments of the present invention, may be consolidated for regulatory accounting and/or for other regulatory compliance purposes and (e.g., evenly) divided out to form n sets of regulatory meters for reporting purposes. Note also that each or some of the N gaming machines may accommodate more than one player. In such a case, there may be more than one level of game performance meter consolidation (e.g., summation), if it is required that each gaming machine generate only a single set of meters that, together with the game performance meters of other gaming machines in the peer-to-peer network, will be summed to form the regulatory meters. Those of skill in this art may devise yet other implementations that fall within the scope of the claimed inventions—such as, for example, a single level of summation, irrespective of the number of gaming machines whose players are playing the same game and contributing to the regulatory meters to be reported or made available to the central system 308. Methods and systems for safeguarding and securely transferring meters in a peer-to-peer environment are disclosed in commonly assigned and co-pending application Ser. No. 11/261,303, filed Oct. 28, 2005, which application is hereby incorporated herein by reference in its entirety.

Instead of the rather tame but remarkably enduring fruit-based games, multiplayer and interactive shoot-'em-up games (of the type popularized by ID Software, Inc.'s popular DOOM® video game, for example) or scripted interactive adventure games (of the type disclosed in, e.g., commonly assigned and co-pending application Ser. No. 11/562,915, filed Nov. 22, 2006, which application is hereby incorporated herein by reference in its entirety) may be emulated or developed in this fashion while enabling a straightforward game certification path. Indeed, such complex multiplayer games may be augmented by providing betting opportunities at strategic points in the game, thereby even further enhancing the player's excitement and stake in the potential outcome of the game or presented scene. This is because, from a regulatory point of view, such multiplayer games, according to embodiments of the present invention, still behave like a "1-player/1-slot/1-game" gaming machine model that generates a single set of regulatory meters, even through each player may see his or her game performance meters on the display of the gaming machine in which he or she is playing. Optionally, the game performance meters of other players may be displayed, whether continuously, periodically, sporadically or on demand. In this case, the graphic elements of the multi-player game need not be synchronized, strictly speaking. Instead, each player may participate in the same scene in the game, but may be provided with graphics that depict the game action only from the point of view of his or her character in the game creating, in effect, an "n-player/n-slots/1-game/n-points of view" model. In this manner, the progress through the game is shared across all players, but the point of view of each of the constituent players may be unique, further enhancing the gaming collaborative experience. Peer-to-peer networking and associated control software may be used to unify the separate gaming machines 402, 404 such that the combination appears as "1-player/1-slot/1-game" for regulatory accounting and to the central or casino management system 308. Peer-to-peer networking may allow two or more gaming machines to be joined together under the same model allowing several players to play the same game, each one being seating at a separate gaming machine, as shown in FIG. 4.

Single-player or two-player mode may be selected by players via a menu displayed on the gaming machine or by the game operator via centrally controlled configuration.

Figure 5:
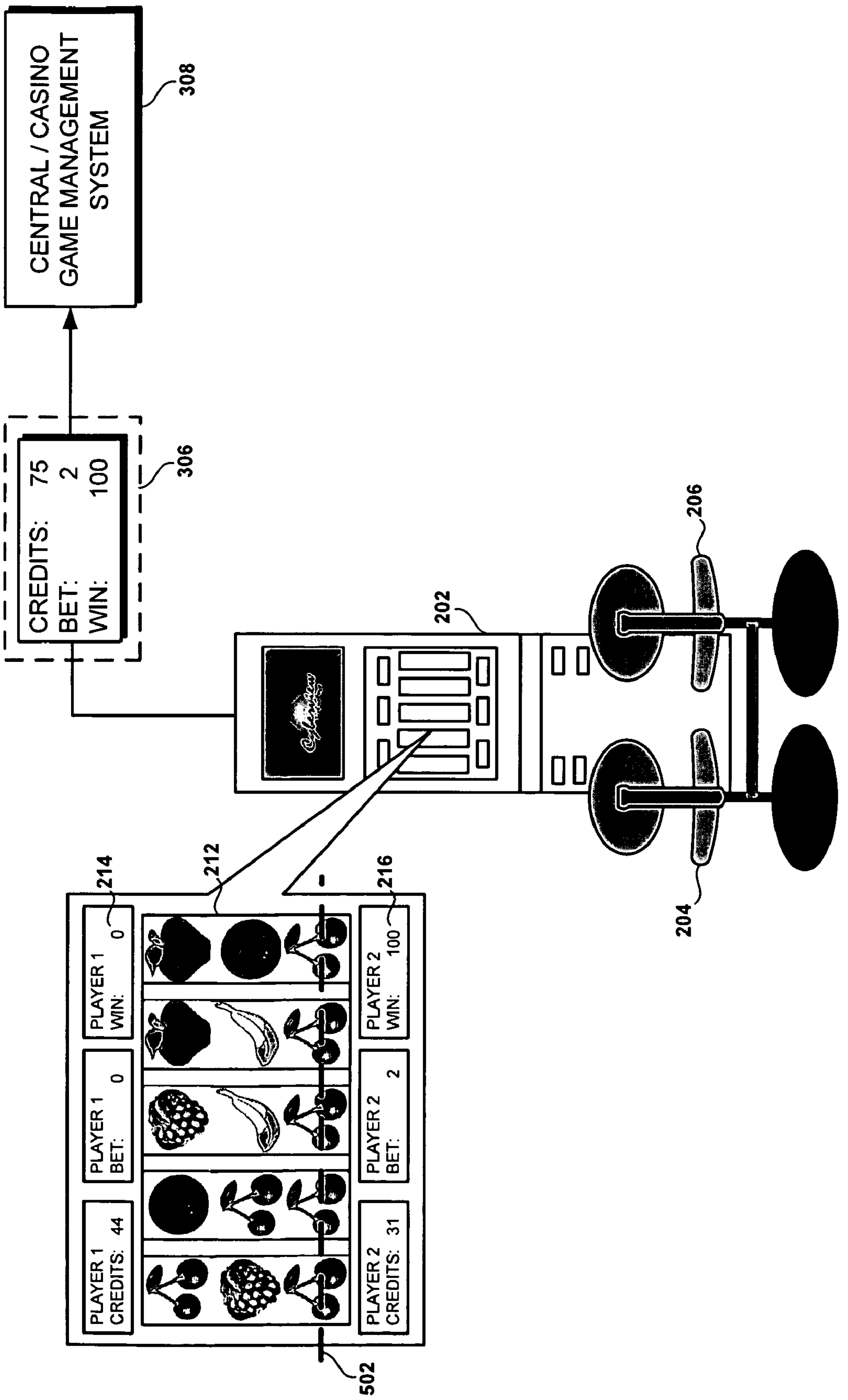
FIG. 5 demonstrates an implementation of player accounting on a two-seater gaming machine, according to an embodiment of the present invention.

FIG. 5 demonstrates how player accounting may work on a two-seater gaming machine, according to an embodiment of the present invention. In this implementation, while the gaming machine 202 displays two sets of game performance meters 214, 216 to differentiate each player's wins and losses, the back end logic within the gaming machine 202 consolidates all gaming transactions by summing the game performance meters 214, 216 and providing only consolidated meters (the regulatory meters 306) to the casino management system 308. Therefore, the casino management system 308 views the meters generated by the two-player gaming machine 202 no differently than the meters generated from a conventional single seat gaming machine seating a single player playing alone and generating a single set of regulatory meters. In this case, player 2 has placed a bet on what turned out to be a winning payline 502 and won 100. The sum of the game performance meters, therefore, is credits: 44+31=75; Bets: 0+2=2; Wins: 0+100=100. Therefore, the regulatory meters 306 indicate Credits: 75; Bets: 2 and Wins: 100, as shown at 306 in FIG. 5. A single set of cash-in and cash-out controls may be provided within the gaming machine 202 for combined use by both player 1 and player 2.

Figure 10:
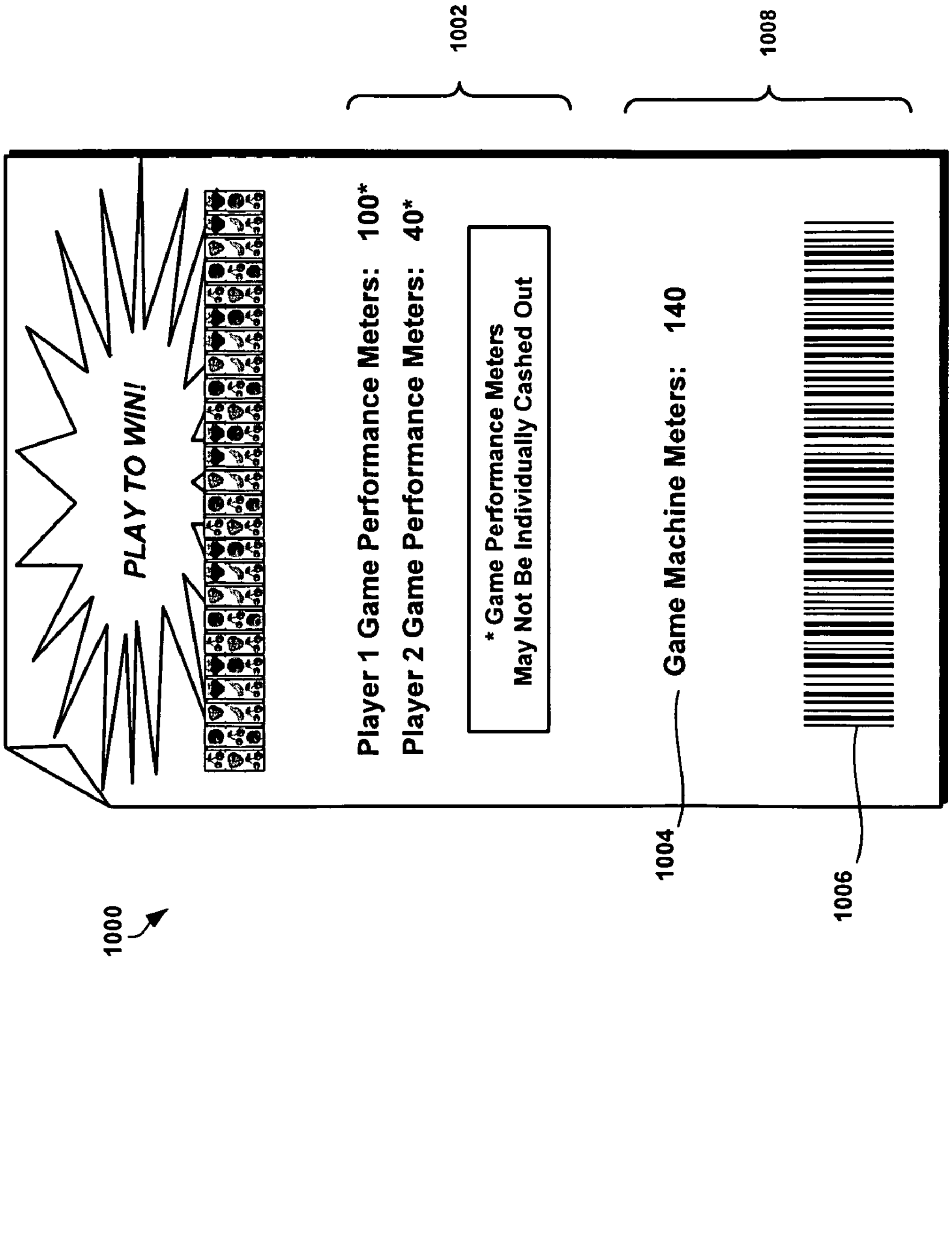
FIG. 10 shows an exemplary ticket that may be printed from a gaming machine according to an embodiment of the present invention.

Another embodiment of the present invention provides for a ticket printer that may be configured to print a ticket that has an indication of, for example, each player's remaining credits, bets and wins. An exemplary ticket is shown in FIG. 10, further discussed hereunder. However, such indications of the individual players' game performances will have no regulatory significance, as the printout of the game performance meters are, according to an embodiment of the present invention, provided only for the players' convenience. For example, should a ticket list each player's remaining credits, bets and/or wins, the players would then be free to settle among themselves after cashing out.

Figure 6:
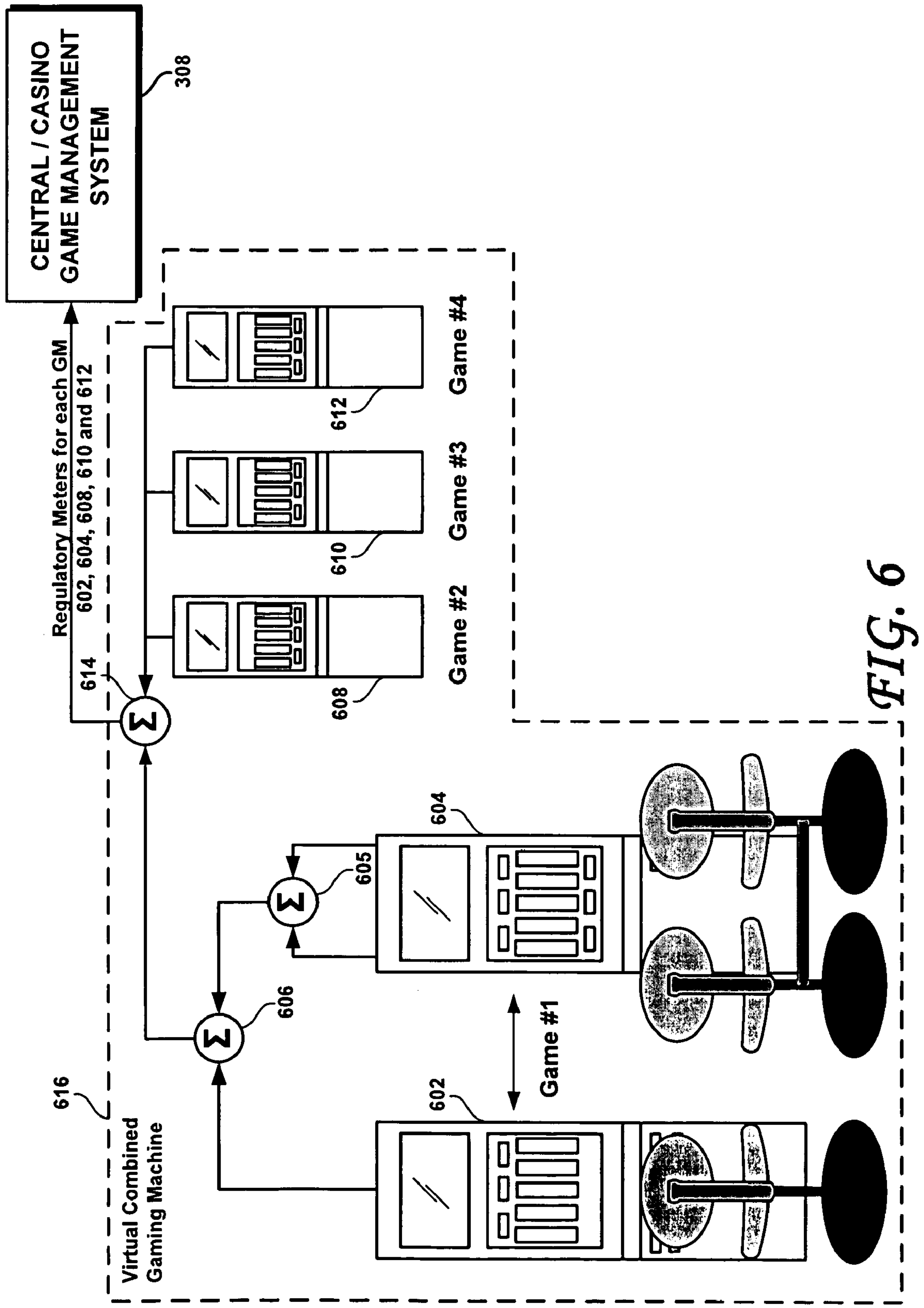
FIG. 6 shows how a back end casino game management systems may view two gaming machines that have been combined to form a two-seater gaming machine as a single gaming machine playing a single game.

FIG. 6 illustrates an embodiment of the present invention in which the game performance meters of a two-seater gaming machine 604 and of a single seater gaming machine 602 are combined at 606 to appear as though the individual gaming machines 602, 604 were a single gaming machine, together with the game performance meters of gaming machines 608, 610 and 612, from an accounting and auditing point of view. Note that gaming machine 604 may include a back end process 605 that sums the game performance meters of its two players. In turn, the summed game performance meters from gaming machine 604 may be summed with those of the single player gaming machine 602, as shown at 606. In turn, the regulatory meters output from the combined gaming machines 602, 604 may be consolidated (added together or summed) in turn, as shown at 614, with the regulatory meters from the gaming machines 608, 610 and 612, and provided to the casino game management system 308. Peer-to-peer networking and associated control software may be used to safeguard game performance and regulatory meters and transfer the same to the casino game management system 308 or even to another gaming machine, as disclosed in commonly assigned and copending application Ser. No. 11/261,303, filed Oct. 28, 2005, which application is hereby incorporated herein in its entirety. In this manner, irrespective of the number of gaming machines and/or the number of players, the casino game management system 308 may recognize and process events occurring within the combined gaming machines as if they came from a single discrete gaming machine that may be called, for example, a virtual combined gaming machine 616. In an embodiment, the game accounting meters of one gaming machine may be disabled while the other gaming machine updates the combined accounting meters.

As noted above, peer-to-peer networking and associated control software may be used to unify separate and distinct gaming machines such that the resulting combination appears as a conventional single player gaming machine for regulatory and accounting purposes and to the central game management system 308. For example, the peer-to-peer networking between the gaming machines may synchronize the graphics and other aspects of the player user interface across gaming machines to reinforce the players' multiplayer gaming experience. Although aspects of the user interface of the gaming machines may be synchronized, the back end consolidation process that sums the game performance meters remains unaffected by the peer-to-peer networking used to combine the gaming machines. In the case wherein a gaming machine (such as gaming machine 602 in FIG. 6) is a 1-player/1-slot/1-game gaming machine, the game performance meters are the same as the regulatory meters, as no summation need take place (or may take place and add a null value thereto).

According to an embodiment of the present invention, the credits of all players in a consolidated group of gaming machines (as shown for example in FIGS. 2-6) may be equally apportioned among the participating players. For example, the game performance meters of players 1 and 2 of FIG. 2 may be split 50% on each game. This paradigm may be expanded to more than two players. For example, in the case wherein the game performance meters of three single-player gaming machines are consolidated, each player may cash out with 33.33% of any remaining credits listed on the regulatory meters. Generalizing, the regulatory meters summed from the game performance meters of N players may be split 1/N on each game. According to an embodiment of the present invention, when any player of a virtual combined gaming machine (as shown in FIG. 6) cashes out, the regulatory meters may computed and all constituent gaming machines of the virtual combined gaming machine may be also cashed out. Alternatively, if authorized by the appropriate gaming jurisdiction, when the credits of any player run out, that player may be dropped as a player of the virtual combined gaming machine (see, e.g., 616 in FIG. 6) and may, therefore, be issued his or her $N^{th}$ share of the credits or may forfeit his or her share of the apportioned 1/N of the credits listed in the regulatory meters. That player's gaming machine may also be dropped from the virtual combined gaming machine 616, unless the gaming machine is a multi-player gaming machine. As the credits of other players of the virtual combined gaming machine run out, they too may be dropped as a player until one player playing on a last gaming machine remains. This player may then take all of any remaining credits listed in the regulatory meters. Such a "last man standing" scheme, if authorized by the applicable gaming regulations, may foster competition among players and keep players at their gaming machines for a longer period of time.

FIG. 7 shows a gaming system 700, according to an embodiment of the present invention. FIG. 7 shows a gaming model that may be called an n-player/n-slot/1-game model. As shown therein, the gaming system 700 may include any number N of gaming machines, denoted in FIG. 7 as GM1, GM2, GM3, . . . , GM N. As shown at 701, the same game may be viewed on each of the gaming machines GM1, GM2, GM3, . . . , GM 3. Each of the N gaming machines may generate, during game play, its own set of performance meters, as shown at 702, 704, 706, . . . , 708. Each of these performance meters may then be consolidated (e.g., added together) as shown at 720 and then divided by the number of gaming machines that contributed game performance meters to the sum generated at 720. In this case, the summed game performance meters are divided by N. In this model, 1/N of the sum of the game performance meters form the regulatory meters 710, 712, 714, . . . , 716 reported by each of the N gaming machines to the central casino management system 308 over the Local Area Network or other computer network 718. In this embodiment, from a regulatory point of view and from the central casino management system's point of view, each gaming machine BM1, GM2, GM3, . . . GMN reports its own regulatory meters, which are each, in this embodiment, equal to 1/N of the sum of the game performance meters 702, 704, 706, . . . , 708. Therefore, no event has taken place which should be of regulatory concern, even though significant new multi-player game play has been enabled. Single-player or multi-player mode may be selected by players via a menu displayed on the gaming machine or by the game operator via centrally controlled configuration.

Figure 8:
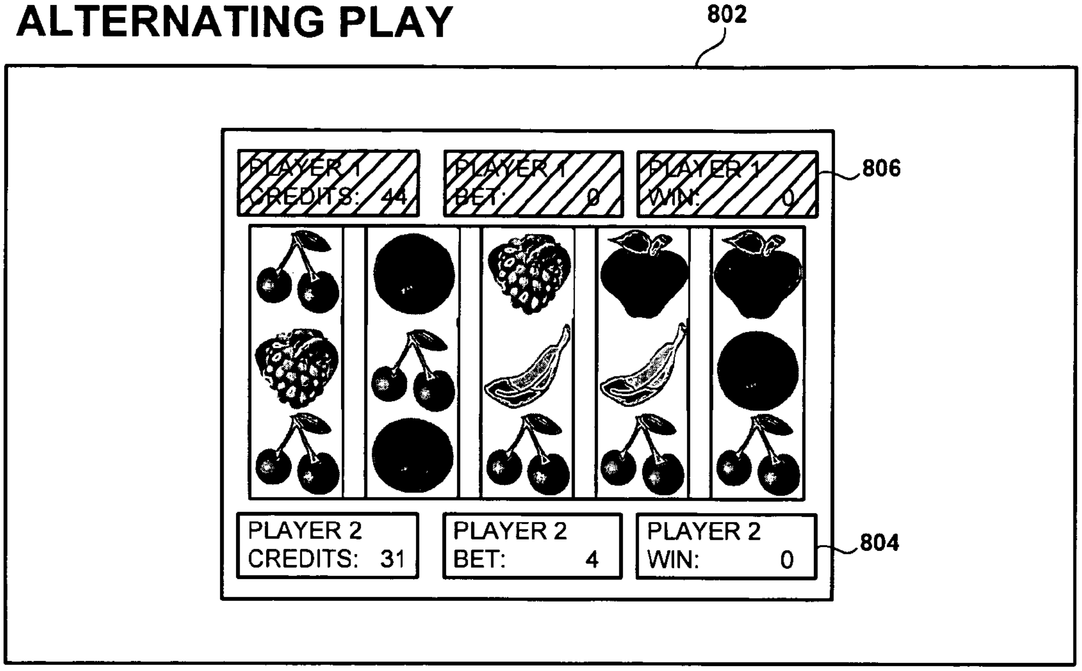
FIG. 8 shows aspects of two embodiments of two-seater gaming, according to further embodiments of the present invention, including alternating play and simultaneous play.
Figure 8:
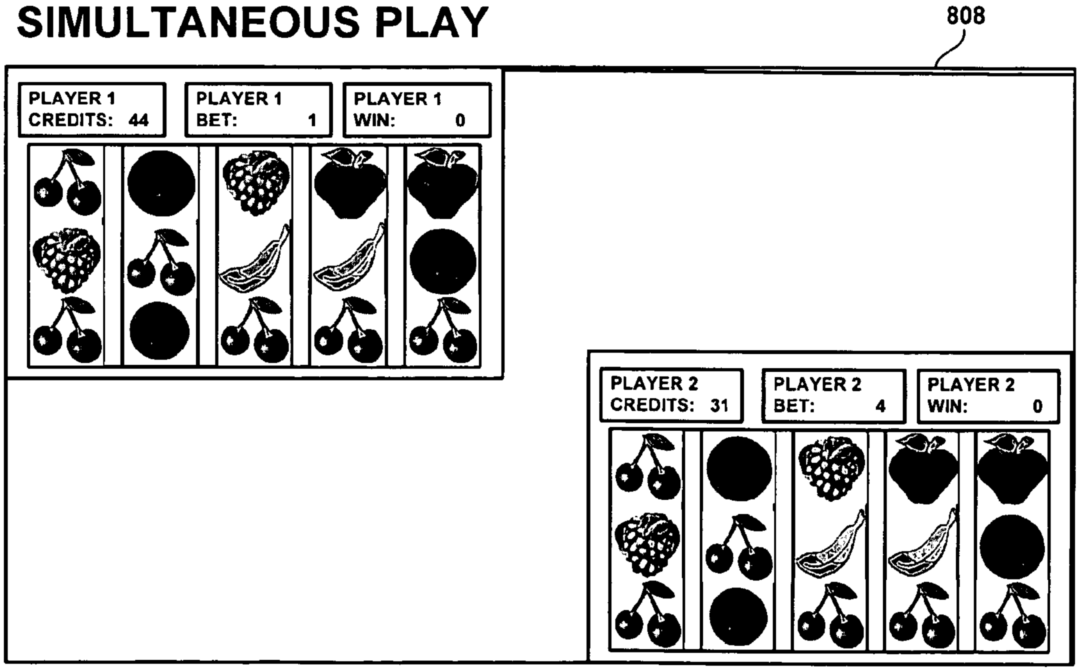

FIG. 8 illustrates two game play modes for two-seater gaming machines, according to further embodiments of the present invention. These game play modes may be called alternating play and simultaneous play. In alternating play 802, each player, using his or her own set of controls, may take turns playing the game. In this mode, the game's onscreen meters (the game performance meters of the currently playing player) may display separate playing statistics for each participating player. Bright colors, blinking lights, or some other technology to emphasize the onscreen meters 804 for the player who is currently playing. Alpha blending technology, for example, may be used to de-emphasize the onscreen meters for players not currently playing, as shown at 806. In simultaneous play 808, each player of a same gaming machine may play at the same time as they might on separate machines, with the gaming machine splitting the screen to accommodate both players, although the same display may be reproduced identically (or near identically) for both players. In this mode, both players' onscreen meters may be clearly displayed. An optional set of meters displaying the shared performance of all players may also be displayed. The screen split need not be disposed along the diagonal as shown in FIG. 8. Instead, those of skill in this art may recognize that the players' game displays may be side-by-side or stacked, for example.

Figure 9:
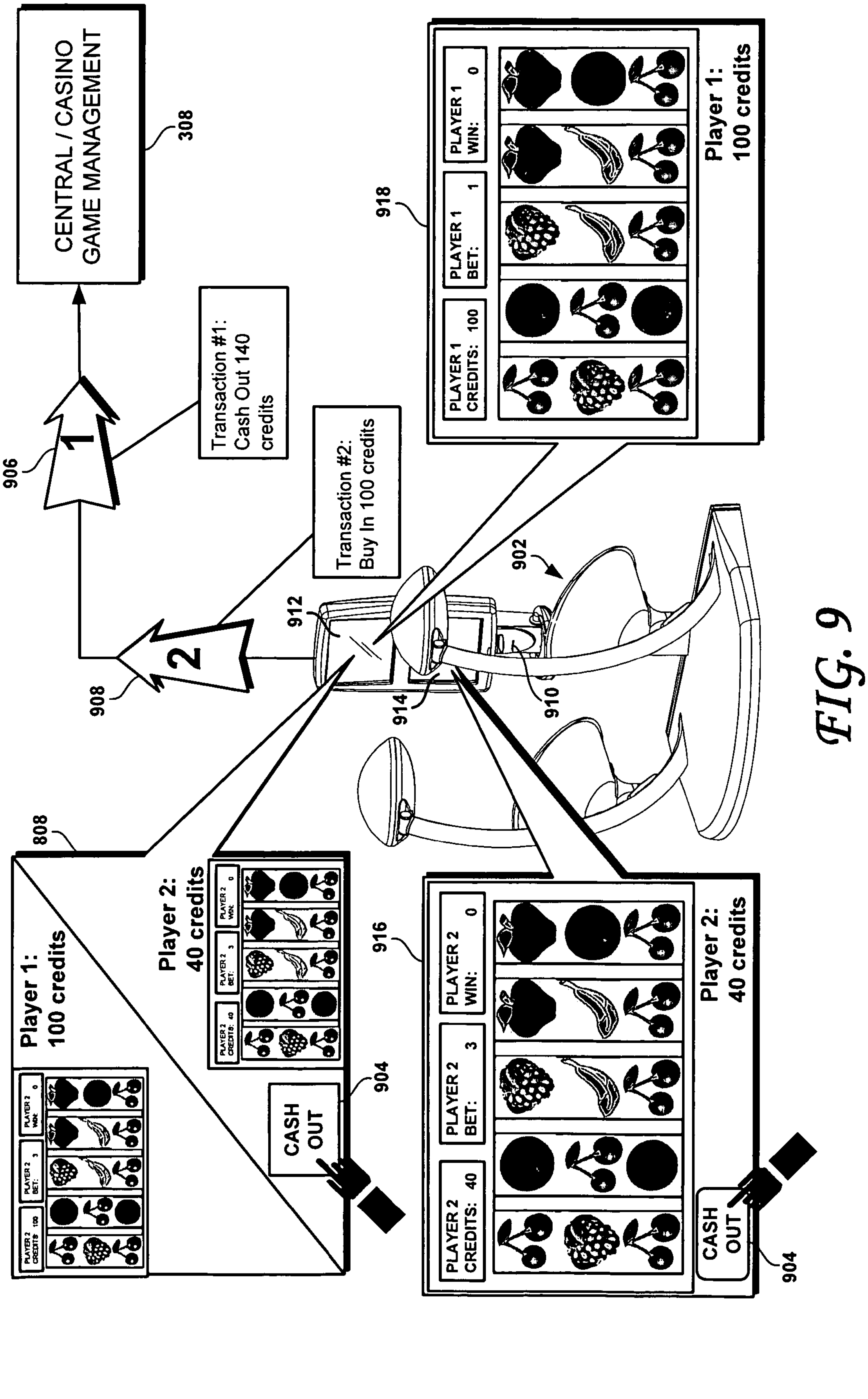
FIG. 9 shows how two-seater gaming machine transactions may be handled as a succession of single-seat transactions to a back end casino game management system, according to an embodiment of the present invention.

FIG. 9 demonstrates how gaming transactions may be handled on the back end in the simultaneous play model shown in FIG. 8, according to an embodiment of the present invention. As shown, the gaming machine 902 may have a first display 912 and a second display 914. For example, the first display 912 may display the game in simultaneous mode 802, whereas the second display may feature a secondary game or other promotional message, for example. Alternately, the second display 914 may display the game in the simultaneous mode 802, whereas the first display may feature a secondary game, additional game statistics and/or other information. Alternately still, the first display 912 and the second display 914 may be configured for the alternating play mode, in which each display 912, 914 displays the game separately, with the first display 912 displaying at least the first player's game performance meters and the second display 914 displaying at least the second player's game performance meters, as shown at 916 and 918. In the simultaneous play model, the two-seater gaming machine 902 may allow two players to play simultaneously and independently while treating transactions on the back end as if such transactions came from only one player. In the example depicted in FIG. 9, Player 1 is playing with 100 credits and Player 2 is playing with 40 credits. In the exemplary scenario posited in FIG. 9, Player 2 then decides to cash out, as shown at 904. Because conventional single-seat games do not process partial cash outs, special back end logic may be employed by the two-seater gaming machine 902 to allow for such a transaction. First, the gaming machine 902 may process a complete cash-out of the combined credits of both players, which amounts to 140 in this case as shown at 906. Next, a process within the gaming machine 902 may, as shown at 908, process a buy-in of 100 credits, the amount that Player 1 wants to keep in play. In this manner, successive transactions by the gaming machine 902 may mimic a cash out of one player while allowing another player on the same gaming machine to continue playing. By structuring the transaction in such a way on the back end, both players may continue normal, uninterrupted game play and the casino's game management network may use its existing systems and logic to accommodate this new form of two-seater game play. When structured as set out above, some operations specific to two-seater gaming machine game play may be emulated by a succession of single-seater play operations and accounting transactions.

As shown at reference numeral 910, the two-seater gaming machine 902 may include a ticket printer. The ticket printer may be configured to print out a ticket having human and/or machine readable indicia representative of the regulatory meters computed by the two-seater gaming machine 902. The ticket printer may also be configured to print a human readable indication of the game performance meters of each of the players of the two-seater gaming machine 902. Note that the game performance meters maintained within the two-seater gaming machine 902 and/or printed on the ticket printed by the printer 910 have no regulatory significance, and may be merely maintained by the two-seater gaming machine and presented to the players (on the two-seater gaming machine's display(s) and/or on the ticket(s) printed by the printer 910) as a convenience and a courtesy.

FIG. 10 shows an exemplary ticket 1000, such as may be printed by a ticket printer 910, according to an embodiment of the present invention. As shown, the ticket 1000 may include human readable text detailing the players' game performance meters, as shown at 1002. In the example shown in FIG. 10, player 1's game performance meters indicate that player 1 has 100 credits, whereas player 2's game performance meters indicate that player 2 has 40 credits remaining. Note that this indication of the players' game performance meters may be provided (if at all) on the ticket 1000 solely as a courtesy and convenience for both players. If the name of the players is available either by direct entry into the gaming machine (using keyboard emulation on the touch screen, for example) or via a player account, the name of each player may be printed on the ticket. Indeed, the game performance meters, according to an embodiment of the present invention, may have no regulatory significance and may not be individually cashed out, and a notice to that effect may also be printed on the ticket 1000, as also shown at 1002. The regulatory meters may be printed on the ticket, as collectively shown at 1008. Indeed, the regulatory meters may be provided in human and/or machine-readable form, as shown at 1004 and 1006, respectively. The regulatory meters need not be identified as "regulatory meters" on the ticket, by may be referred to by any other term or phrase such as, for example, "Game Machine Meters" as shown at 1004, or may be referred to by some functionally equivalent expression. It is to be understood that the ticket 1000 may also include other indicia, including, but not limited to, an indication of the gaming machine, an identification of the casino, various security codes and/or devices, in addition to promotional and/or player loyalty messages or information.

Figure 11:
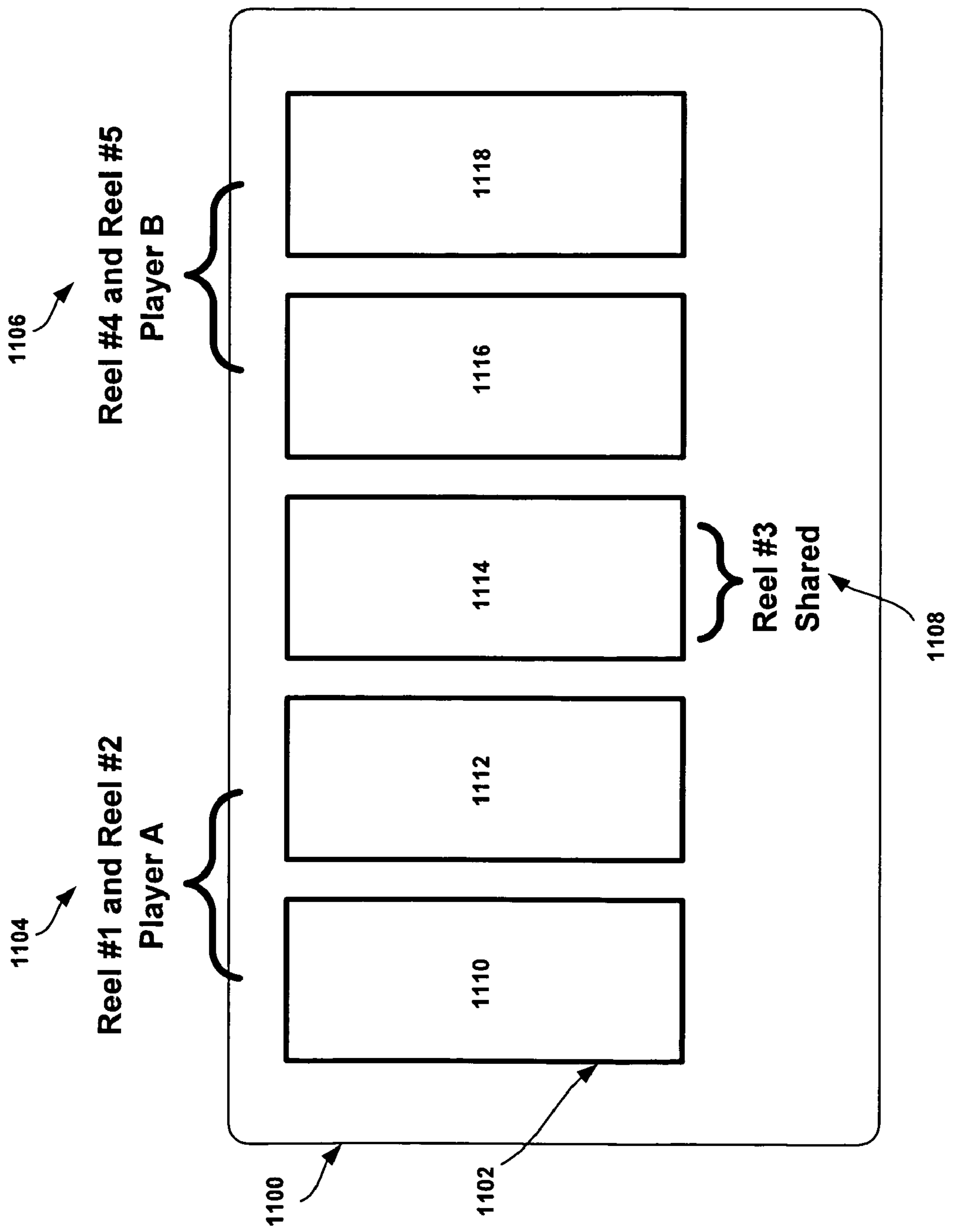
FIG. 11 shows an exemplary 2-seater 1-game gaming machine in which a traditional 5-wheel video fruit machine is configured for multi-player gaming and wagering, according to an embodiment of the present invention.

FIG. 11 shows an exemplary 2-seater 1-game wherein a traditional 5-wheel video fruit machine 1100, 1110, 1112, 1114, 1116 and 1118 is viewed in the video-display 1100 and is configured, for example, such that (a) the 2 left wheels 1110 and 1112 are assigned to player A 1104, (b) the 2 right wheels 1116 and 1118 are assigned to player B 1106, and (c) the middle wheel 1108 is shared between both players A and B. The handle pull may be activated according to a variety of player activation logic as discussed previously. It is to be noted that the wheels may be shared by both players in most any configuration, this embodiment is not limited to the exemplary wheel-to-player assignment shown in FIG. 11.

Figure 12:
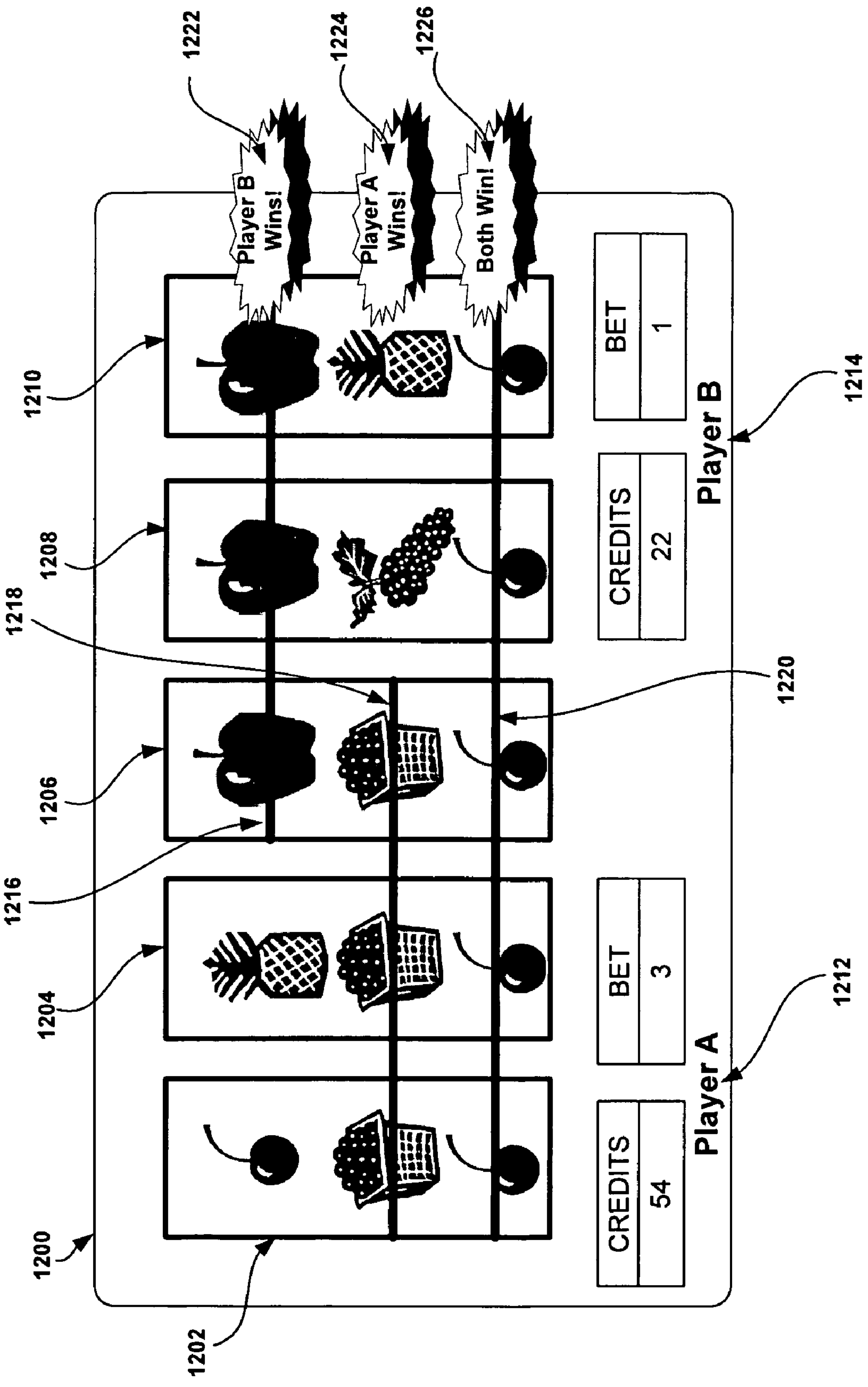
FIG. 12 shows exemplary winning results for the exemplary 2-seater, 1 game gaming machine of FIG. 11.

FIG. 12 illustrate exemplary winning results shown on the video-display 1200 after the 5 wheels 1202, 1204, 1206, 1208 and 110 have stopped. In this example, a 3-symbol line 1216 is obtained across the 2 right wheels 1208 and 1210 assigned to player B 1214 and the shared wheel 1206; consequently player B wins credits (e.g., a predetermined amount of money) 1222. In this example, a 3-symbol line 1218 is also obtained across the 2 left wheels 1202 and 1204 assigned to player A 1212 and the shared wheel 1206; consequently player A wins credits 1224. In this example, in addition, a 5-symbol line 1220 is obtained across the 5 wheels; consequently both player A and player B win credits 1226.

The game depicted in the exemplary FIG. 11 and FIG. 12 may be extended to non-fruit games having virtual lines and chip-based wagering such as disclosed in commonly assigned and co-pending application Ser. No. 10/837,017, filed Apr. 30, 2004, and application Ser. No. 11/409,722, filed Apr. 24, 2006, now U.S. Pat. No. 7,371,173, which application and patent are hereby incorporated herein by reference in their entireties. Moreover, the game depicted in FIGS. 11 and 12 may be extended still further to more than 2 players across several gaming machines in a peer-to-peer fashion (i.e. N-player/1-game). In the case of the fruit game, the symbols are grouped by wheel, and a predetermined number of wheels (or regions) are assigned to each player. In non-fruit games, predetermined regions of symbols may be assigned to each player, and visible lines or virtual lines spanning across the regions may provide interesting winning combinations. Virtual lines may invisibly link features such as "shapes," "color," "blinking symbol," "corner" and "a number," for example.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for a multi-reel game to be played on a single regulated gaming machine by two players, the method comprising the steps of:

assigning a predetermined number of reels of the multi-reel gaming machine to a first player and a predetermined number of reels of the multi-reel gaming machine to a second player, at least one of the reels assigned to the first player being different from any of the reels assigned to the second player, at least one of the reels assigned to the second player being different from any of the reels assigned to the first player and at least one of the reels being assigned to both the first and second players;

maintaining game performance meters for each player;

consolidating the game performance meters into regulatory meters;

providing a random outcome upon player interaction and displaying the symbols associated with the random outcome; and awarding credits to the first player if a winning symbol combination of symbols is displayed on the reels assigned to the first player and awarding credits to the second player if a winning symbol combination is displayed on the reels assigned to the second player.

2. The method of claim 1, wherein the consolidating step is carried out with the regulatory meters in each gaming machine providing metering for one player, one game and one gaming machine.

3. The method of claim 2, further comprising the step of awarding credits to be shared amongst both players when a predetermined winning symbol combination is obtained across all reels.

4. The method of claim 2, further comprising a step of enabling selection of a single-player mode or in two-player mode and enabling game play accordingly.

5. The method of claim 1, wherein the awarding step is carried out with only one of the first and second players being awarded credits.

6. The method of claim 1, wherein the awarding step is carried out with both the first and second players being awarded credits.

7. The method of claim 1, wherein the awarding step is carried out with one of the first and second players being awarded a greater number of credits than the other one of the first and second players.

8. A method, comprising:

providing a regulated game, the regulated game including a plurality of symbols disposed so as to define at least a first symbol region and a second symbol region, at least a first one of the plurality of symbols being disposed only in the first symbol region, at least a second one of the plurality of symbols being disposed only in the second region and at least a third one of the plurality of symbols being disposed in both the first and second regions;

assigning at least the first symbol region to a first player and assigning at least the second symbol region to a second player;

maintaining separate game performance meters for the first player and for the second player;

consolidating the separate game performance meters maintained for the first and second players into regulatory meters;

providing an outcome across the at least first and second symbol regions upon each player interaction and providing a combination of the plurality of symbols associated with the outcome; and awarding credits to the first player at least when the symbol combination associated with the outcome includes a winning symbol combination in the first symbol region and awarding credits to the second player at least when the symbol combination associated with the outcome includes a winning symbol combination in the second symbol region.

9. The method of claim 8, further comprising the step of awarding credits to be shared amongst at least the first and second players when a predetermined winning symbol combination is obtained spanning across the at least first and second symbol regions.

10. The method of claim 8, further comprising selecting whether the game is played in single-player mode or in multiplayer mode.

11. The method of claim 8, wherein the consolidating step is carried out with the regulatory meters providing metering for one player, one game on one gaming machine.

12. The method of claim 8, wherein the providing step is carried out with the providing step being carried out with the game being a slot game including a plurality of spinning reels having the plurality of symbols provided thereon.

13. The method of claim 8, wherein the awarding step is carried out with only one of the fast and second players being awarded credits.

14. The method of claim 8, wherein the awarding step is carried out with both the first and second players being awarded credits.

15. The method of claim 8, wherein the awarding step is carried out with one of the first and second players being awarded a greater number of credits than the other one of the first and second players.

* * * * *